US010683926B2

(12) United States Patent
Kawai et al.

(10) Patent No.: US 10,683,926 B2
(45) Date of Patent: Jun. 16, 2020

(54) OIL PUMP DRIVING DEVICE

(71) Applicant: NTN CORPORATION, Osaka (JP)

(72) Inventors: Masahiro Kawai, Shizuoka (JP); Koji Sato, Shizuoka (JP)

(73) Assignee: NTN CORPORATION, Osaka (JP)

( * ) Notice: Subject to any disclaimer, the term of this patent is extended or adjusted under 35 U.S.C. 154(b) by 157 days.

(21) Appl. No.: 16/065,193

(22) PCT Filed: Dec. 16, 2016

(86) PCT No.: PCT/JP2016/087531
§ 371 (c)(1),
(2) Date: Jun. 22, 2018

(87) PCT Pub. No.: WO2017/110671
PCT Pub. Date: Jun. 29, 2017

(65) Prior Publication Data
US 2019/0017588 A1    Jan. 17, 2019

(30) Foreign Application Priority Data

Dec. 24, 2015 (JP) ................................. 2015-251841

(51) Int. Cl.
*F16H 57/04* (2010.01)
*B60K 17/06* (2006.01)
(Continued)

(52) U.S. Cl.
CPC ......... *F16H 57/0439* (2013.01); *B60K 17/06* (2013.01); *B60K 17/26* (2013.01);
(Continued)

(58) Field of Classification Search
CPC ...... F04C 15/00; F04C 15/0061; F04C 2/344; F04C 2/10; B60K 17/06; B60K 6/383;
(Continued)

(56) References Cited

U.S. PATENT DOCUMENTS

| 5,993,169 | A | * | 11/1999 | Adachi | ..................... B60K 6/26 417/223 |
| 6,135,740 | A | | 10/2000 | Hult et al. | |
| 7,753,822 | B2 | * | 7/2010 | Weinschenker | .... F16H 57/0434 180/65.285 |
| 9,677,646 | B2 | * | 6/2017 | Kasuya | ..................... B60K 6/26 |

(Continued)

FOREIGN PATENT DOCUMENTS

| CN | 202251841 | 5/2012 |
| CN | 103032311 | 4/2013 |

(Continued)

OTHER PUBLICATIONS

International Preliminary Report on Patentability dated Jun. 26, 2018 in International (PCT) Application No. PCT/JP2016/087531.

(Continued)

*Primary Examiner* — Jeremy R Severson
(74) *Attorney, Agent, or Firm* — Wenderoth, Lind & Ponack, L.L.P.

(57) ABSTRACT

An oil pump driving device includes an oil pump to be driven by either of an engine and an electric motor, and is short in axial dimension. The oil pump driving device includes a first one-way clutch for transmitting motive power from the engine only in one direction, and a second one-way clutch for transmitting motive power from the electric motor only in the above one direction. The first one-way clutch is disposed within an opening formed in a partition wall of a transmission case. The oil pump includes a rotor having an inner peripheral portion defining a hollow space. The second one-way clutch is disposed inside of the inner peripheral portion of the rotor.

6 Claims, 4 Drawing Sheets

(51) Int. Cl.

| | | |
|---|---|---|
| *F04C 2/344* | (2006.01) | |
| *F16D 41/067* | (2006.01) | |
| *F16H 61/00* | (2006.01) | |
| *F16D 47/04* | (2006.01) | |
| *B60K 17/26* | (2006.01) | |
| *F04B 17/05* | (2006.01) | |
| *F04C 15/00* | (2006.01) | |
| *F04B 17/03* | (2006.01) | |

(52) U.S. Cl.
CPC .............. *F04B 17/03* (2013.01); *F04B 17/05* (2013.01); *F04C 2/344* (2013.01); *F04C 15/0061* (2013.01); *F16D 41/067* (2013.01); *F16D 47/04* (2013.01); *F16H 57/04* (2013.01); *F16H 57/0424* (2013.01); *F16H 57/0426* (2013.01); *F16H 57/0441* (2013.01); *F16H 61/0028* (2013.01); *F04C 2240/45* (2013.01); *F16H 57/043* (2013.01); *F16H 57/0479* (2013.01)

(58) Field of Classification Search
CPC ......... B60K 17/26; B60K 17/02; F16H 57/04; F16H 57/0441; F16H 57/0439; F16H 61/0028; F16D 41/067; F16D 47/04; F04B 17/05
See application file for complete search history.

(56) References Cited

U.S. PATENT DOCUMENTS

| | | |
|---|---|---|
| 2003/0035742 A1 | 2/2003 | Vukovich et al. |
| 2008/0194369 A1* | 8/2008 | Boutou ............... B60K 6/365 475/5 |
| 2009/0023529 A1 | 1/2009 | Sanji et al. |
| 2013/0071263 A1 | 3/2013 | Hwang |
| 2016/0245373 A1 | 8/2016 | Kasuya et al. |
| 2018/0283375 A1* | 10/2018 | Kawai ..................... F04C 15/00 |

FOREIGN PATENT DOCUMENTS

| | | |
|---|---|---|
| EP | 3 047 994 | 7/2016 |
| EP | 3 354 898 | 8/2018 |
| JP | 54-168613 | 5/1953 |
| JP | 58-065178 | 5/1983 |
| JP | 10-089446 | 4/1998 |
| JP | 2011-106543 | 6/2011 |
| JP | 2014-177902 | 9/2014 |

OTHER PUBLICATIONS

International Search Report dated Feb. 21, 2017 in International (PCT) Application No. PCT/JP2016/087531.

Extended European Search Report dated Dec. 11, 2018 in European Patent Application No. 16878560.8.

\* cited by examiner

OIL PUMP DRIVING DEVICE

TECHNICAL FIELD

The present invention relates to an oil pump driving device mounted in automobiles.

BACKGROUND ART

For example, a vane pump including a rotor configured to receive motive power, or an internal gear pump is used as an oil pump for supplying hydraulic oil to fluid devices mounted in an automobile, such as a hydraulic motive power steering system and a hydraulic continuously variable transmission (Japanese Patent Publication No. 2014-17790 and Japanese Patent Publication No. 2011-106543A).

In an automobile provided with a control device configured to stop the engine under a predetermined stop condition, and to start the engine under a predetermined start condition, e.g. when the accelerator pedal is pressed, an oil pump is driven by an electric motor while the engine is not operating.

The oil pump driving device disclosed in Japanese Patent Publication No. 2011-106543A (hereinafter the JP '543 patent) includes a single oil pump; a path through which the motive power output from the engine is transmitted to the oil pump; and a path through which the motive power output from the electric motor is transmitted to the oil pump. These paths each include a one-way clutch configured to selectively permit and stop the transmission of motive power to the oil pump. These one-way clutches are both configured to be locked/engaged when motive power in the same one direction is applied thereto (so as to transmit the motive power). Such an oil pump driving device is therefore configured such that the single oil pump can be driven by either of the engine and the electric motor.

In the oil pump driving device of the JP '543 patent, since the two one-way clutches are disposed on the respective sides of the oil pump, the entire axial length of the housing in which these components are received is large. It is thus difficult to mount this oil pump driving device to the engine or the transmission.

In view of the above background, it is an object of the present invention to provide an oil pump driving device which includes a single oil pump capable of being driven by either of the engine and the electric motor, and which is short in entire axial length.

SUMMARY OF THE INVENTION

In order to achieve the above object, the present invention provides an oil pump driving device comprising: a single oil pump including a rotor configured to receive motive power; a first one-way clutch configured to transmit motive power from an engine only in one direction; and a second one-way clutch configured to transmit motive power from an electric motor only in said one direction, wherein the oil pump driving device further comprises a transmission case having a partition wall formed with an opening; the first one-way clutch is disposed within the opening of the transmission case; the rotor has an inner peripheral portion defining a hollow space; the second one-way clutch is disposed inside of the inner peripheral portion of the rotor; and the transmission case is coupled to the oil pump.

By disposing the first one-way clutch, which is configured to transmit the motive power from the engine toward the rotor of the oil pump, within an opening formed in the partition wall of the transmission case, the first one-way clutch can be installed effectively using the wall thickness of the partition wall. By disposing the second one-way clutch, which is configured to transmit the motive power from the electric motor toward the rotor of the oil pump, inside of the inner peripheral portion of the rotor (within the hollow space), the second one-way clutch can be installed effectively using the axial width of the rotor. Thus, with the oil pump driving device fully assembled, i.e., with the transmission case coupled to the oil pump, this oil pump driving device is small in axial dimension.

Advantages of the Invention

The oil pump driving device of the present invention, configured such that the single oil pump can be driven by either of the engine and the electric motor, is short in axial length.

DETAILED DESCRIPTION OF THE INVENTION

Figure 2:
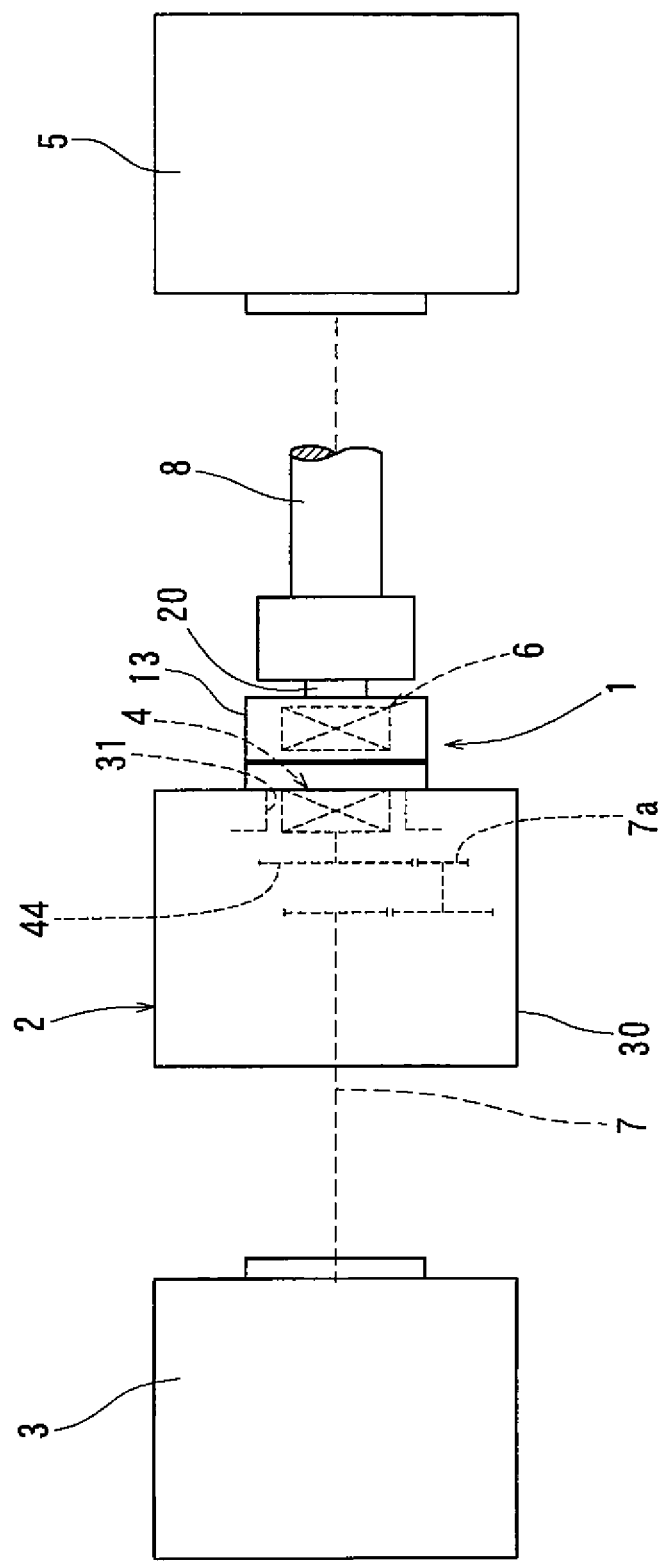
FIG. 2 is a schematic diagram illustrating motive power transmission paths through which motive power is transmitted to the oil pump of the oil pump driving device of FIG. 1.

An oil pump driving device embodying the present invention is now described with reference to the attached drawings. As illustrated in FIG. 2, the oil pump driving device includes a single oil pump 1; a transmission case 2; a first one-way clutch 4 configured to transmit the motive power from an engine 3 only in one direction; and a second one-way clutch 6 configured to transmit the motive power from an electric motor 5 only in the above one direction. The oil pump driving device further includes an engine-side motive power transmission path 7 configured to transmit the motive power from the engine 3 to the first one-way clutch 4; and a motor-side motive power transmission path 8 configured to transmit the motive power from the electric motor 5 to the second one-way clutch 6.

Figure 1:
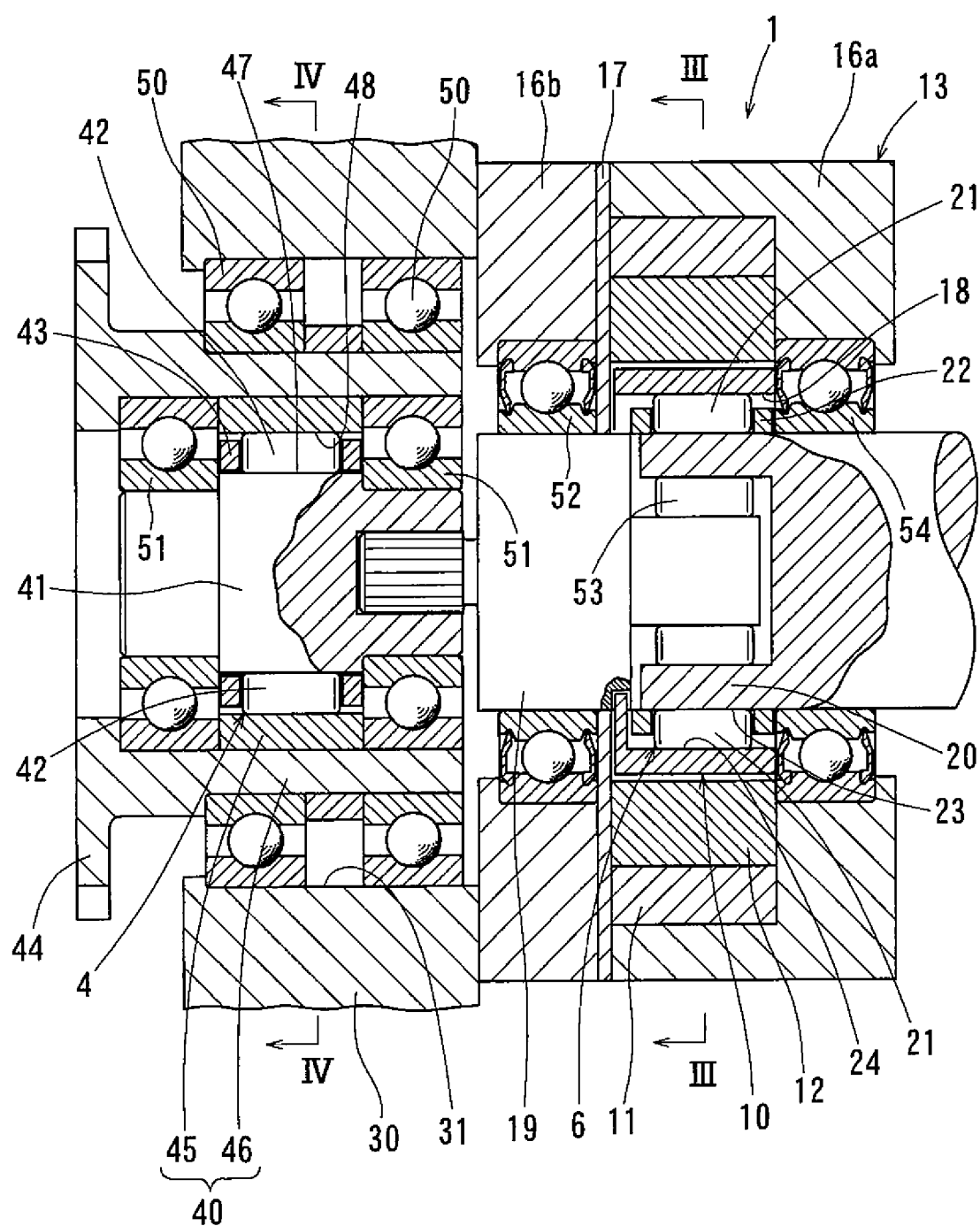
FIG. 1 is a sectional view of an oil pump driving device embodying the present invention.
Figure 3:
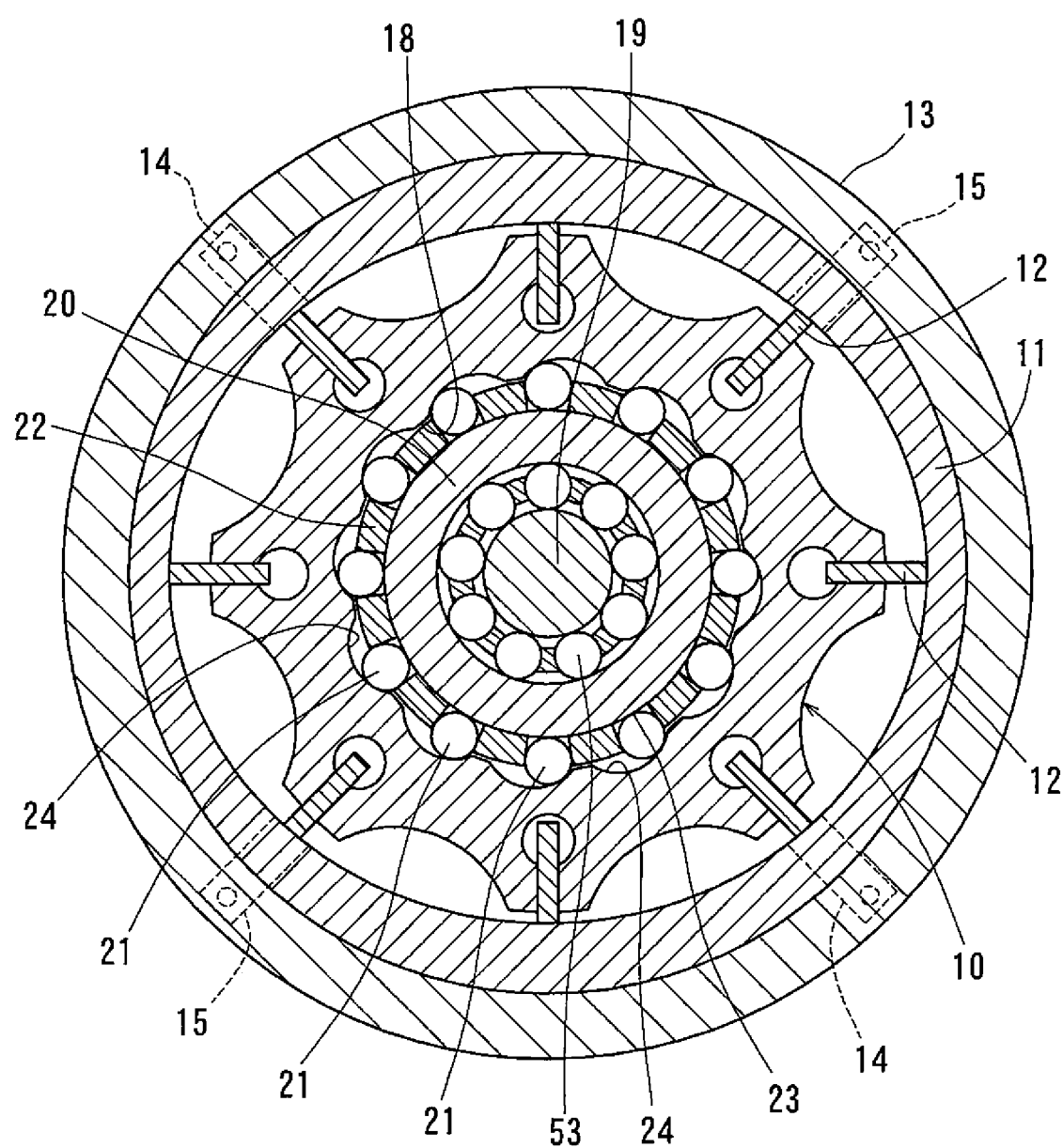
FIG. 3 is a sectional view taken along line of FIG. 1.

Referring to FIGS. 1 and 3, the oil pump 1 is a vane pump including a rotor 10 configured to receive motive power; a cam ring 11 surrounding the rotor 10; a plurality of vanes 12 retained by the rotor 10; and a housing 13 in which the rotor 10 and the cam ring 11 are received. The direction along the rotation center axis of the rotor 10 is hereinafter referred to as the "axial direction"; the direction perpendicular to the axial direction is hereinafter referred to as the "radial direction"; and the direction about the rotation center axis of the rotor 10 is hereinafter referred to as the "circumferential direction".

When the rotor 10 receives motive power and rotates, the vanes 12, retained in respective grooves of the rotor 10 so as to be movable in the radial direction, rotate along an eccentric inner surface of the cam ring 11 while being pressed against the inner surface due to the oil pressure applied to the vanes 12 from a hydraulic circuit intersecting with the terminal ends of the grooves of the rotor 10, as well as under centrifugal force. This changes the volumes of oil chambers (pump chambers) defined by the respective circumferentially adjacent pairs of vanes 12, the inner surface of the cam ring 11, and the housing 13, so that oil is sucked into and discharged from the oil chambers. The cam ring 11 and the housing 13 are provided with a plurality of oil discharge paths 14 through which the interiors of the oil chambers communicate with the exterior of the housing 13 such that oil is discharged from the oil chambers through the oil discharge paths 14 while the corresponding oil chambers are in the compression phase; and a plurality of oil suction paths 15 through which the interiors of the oil chambers communicate with the exterior of the housing 13 such that oil is sucked into the oil chambers through the oil suction paths 15 while the corresponding oil chambers are in the suction phase.

As illustrated in FIG. 1, the housing 13 includes a housing main body 16a and a housing lid 16b which can be disassembled so that the cam ring 11 and the rotor 10 can be axially received into the housing 13; and a seal ring 17 arranged between the housing main body 16a and the housing lid 16b. The second one-way clutch 6 is disposed in a hole extending axially through the housing 13.

While the oil pump 1 is a vane pump in the embodiment, the oil pump 1 may be any oil pump capable of functioning as a pump when the rotor rotates due to the motive power transmitted to the rotor from the engine side transmission path or the motor side motive power transmission path. For example, the oil pump 1 may be an internal gear pump as disclosed in the JP '543 patent. In this case, the inner rotor of the internal gear pump which has an external gear is used as the rotor for receiving motive power.

As shown in FIGS. 1 and 3, the rotor 10 is a hollow rotor including an inner peripheral portion 18 defining a hollow space axially extending through the rotor 10. The second one-way clutch 6 is disposed inside of the inner peripheral portion 18 of the rotor 10.

The second one-way clutch 6 includes an input shaft 20 inserted into the space defined inside of the inner peripheral portion 18 of the rotor 10 from one axial side (right side in FIG. 1) of the oil pump 1; second engagement elements 21 configured to transmit motive power between the input shaft 20 and the inner peripheral portion 18 of the rotor 10; and a second retainer 22 retaining the second engagement elements 21. Elastic members (not shown) are mounted to the second retainer 22 to bias the second engagement elements 21.

As illustrated in FIG. 2, the input shaft 20 is connected, outside of the housing 13, to the motor side motive power transmission path 8 so that the motive power from the electric motor 5 is transmitted to the second engagement elements 21, shown in FIG. 1.

As shown in FIGS. 1 and 3, the input shaft 20 has a cylindrical surface 23 formed on the portion of the outer periphery of the input shaft 20 located inside of the inner peripheral portion 18 of the rotor 10. The rotor 10 has cam surfaces 24 formed on its inner peripheral portion 18 so as to be circumferentially spaced apart from each other at predetermined intervals such that wedge-shaped spaces are defined between the respective cam surfaces 24 and the cylindrical surface 23. The wedge-shaped spaces each narrow in the counterclockwise direction in FIG. 3. The cylindrical surface 23 may be a surface of an element of the input shaft 20 provided separately from the main body of the input shaft 20, and the first cam surfaces 24 may be surfaces of an element or elements of the rotor 10 provided separately from the main body of the rotor 10.

The second engagement elements 21 are rollers received in the respective wedge-shaped spaces, and biased by the above-described respective elastic members in the counterclockwise direction (in FIG. 3) so as to be kept in contact with the cylindrical surface 23 and the respective cam surfaces 24.

When the input shaft 20 rotates in the counterclockwise direction (in FIG. 3) relative to the rotor 10, the contact surface pressure between the second engagement elements 21 and the cam surfaces 24 increases due to the wedge action, and thus the second engagement elements 21 engage the cylindrical surface 23 and the respective cam surfaces 24, so that motive power is transmitted to the rotor 10 through the second engagement elements 21. On the other hand, when the input shaft 20 rotates in the clockwise direction (in the figure) relative to the rotor 10, the contact surface pressure between the second engagement elements 21 and the cam surfaces 24 decreases, and thus the second engagement elements 21 are unable to engage the cylindrical surface 23 and the respective cam surfaces 24, so that no motive power is transmitted through the second engagement elements 21.

As shown in FIG. 2, the transmission case 2 is a casing that constitutes a portion of the engine side motive power transmission path 7, and houses a transmission mechanism (not shown). The transmission case 2 has a partition wall 30 in the form of a plate separating the interior space of the transmission case 2, in which the transmission mechanism is housed, from its exterior. The partition wall 30 has a wall thickness large enough to provide sufficient mechanical strength to the transmission case 2. The transmission mechanism may be of any type, including a constantly variable transmission (CVT).

The transmission case 2 has an opening 31 extending axially through the partition wall 30 from its inner to outer surface. The partition wall 30 is coupled to the housing 13 of the oil pump 1 by e.g., bolts, screws, or welding.

Figure 4:
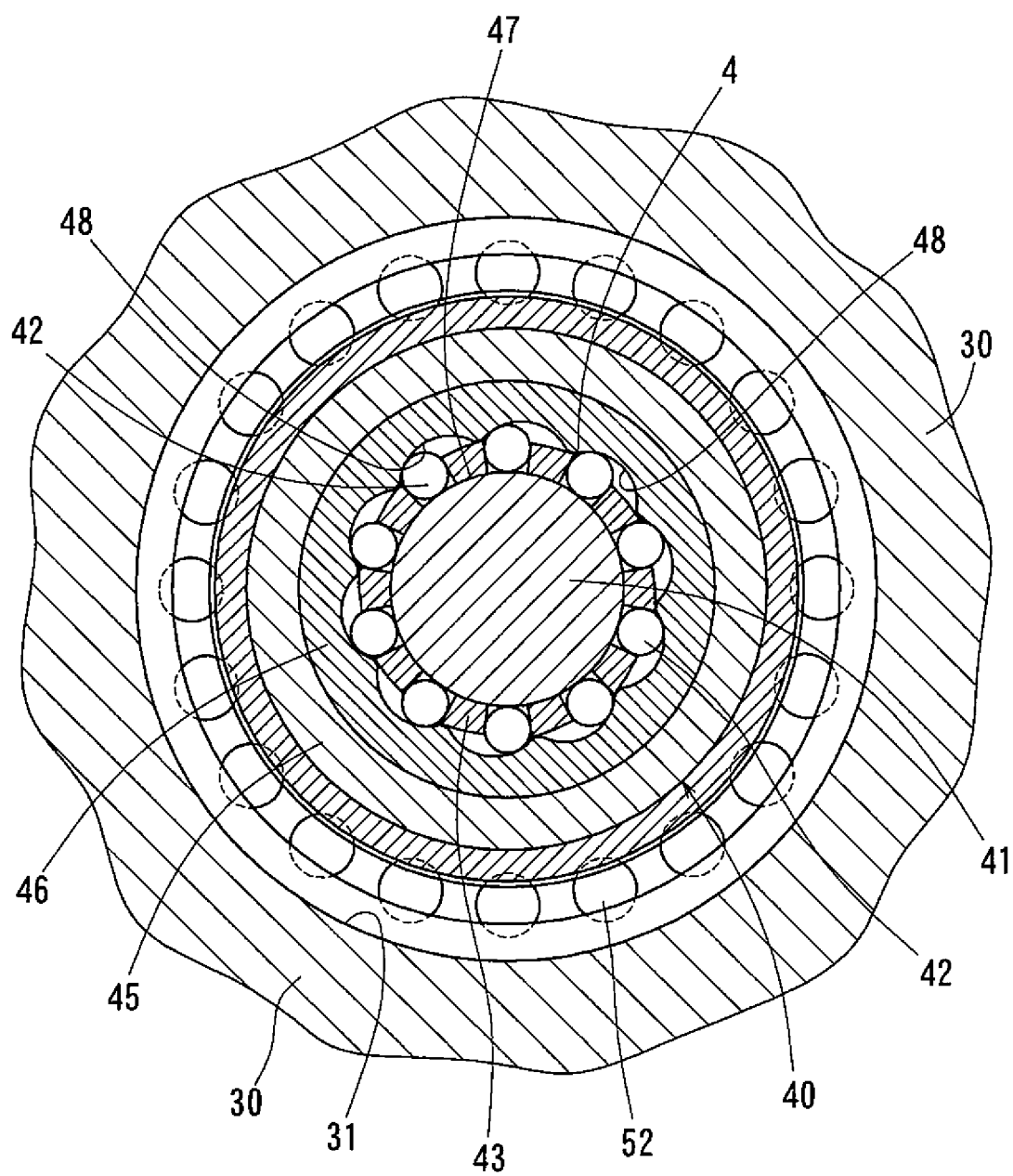
FIG. 4 is a sectional view taken along line IV-IV of FIG. 1.

As shown in FIGS. 1 and 4, the first one-way clutch 4 is disposed within the opening 31 of the transmission case 2.

The first one-way clutch 4 includes a clutch outer ring 40 disposed within the opening 31; an output shaft 41 disposed within the opening 31; first engagement elements 42 configured to transmit motive power between the clutch outer ring 40 and the output shaft 41; a first retainer 43 retaining the first engagement elements 42; and a sprocket 44 configured to transmit motive power from the engine. Elastic members (not shown) are mounted to the first retainer 43 to bias the first engagement elements 42.

The clutch outer ring 40 serves as an input shaft configured to transmit the motive power from the engine to the first engagement elements 42. While, in the example shown, the clutch outer ring 40 comprises an inner ring member 45 kept in contact with the first engagement elements 42, and an outer ring member 46 fitted on the outer periphery of the inner ring member 45, the clutch outer ring 40 may be an integral, one-piece component.

The sprocket 44 is integral with the clutch outer ring 40, and, as shown in FIG. 2, meshes, in the transmission case 2, with a motive power transmission gear 7a which constitutes a portion of the engine side motive power transmission path 7. The sprocket 44 thus transmits the motive power from the engine 3 to the first one-way clutch 4.

It is required that the sprocket 44 be rotatable in unison with the member that serves as the input shaft of the first one-way clutch 4. For this purpose, the sprocket 44 may be integral with this member, or may be separately provided from, and fixed to, this member.

The sprocket 44 shown in FIGS. 1 and 4 is integral with the outer ring member 46 of the clutch outer ring 40, and thus is practically integral with the clutch outer ring 40, because the inner ring member 45 and the outer ring member 46 are fitted together.

The output shaft 41 is a rotary shaft configured to output the motive power from the first engagement elements 42, and is disposed inside of the clutch outer ring 40.

The first one-way clutch 4 is a roller clutch, as is the second one-way clutch 6. That is, the first one-way clutch 4 is configured such that, when the clutch outer ring 40 rotates in the counterclockwise direction in FIG. 4, relative to the rotor 10, the first engagement elements 42 engage a cylindrical surface 47 formed on the output shaft 41 and cam surfaces 48 formed on the inner ring member 45 of the clutch outer ring 40 so as to transmit motive power to the output shaft 41, and thus to the rotor 10, and when the clutch outer ring 40 rotates in the clockwise direction in FIG. 4 relative to the rotor 10, the first engagement elements 42 prevent transmission of motive power to the output shaft 41.

The clutch outer ring 40 is supported by bearings 50 so as to be rotatable relative to the opening 31 of the partition wall 30. The bearings 50 are rolling bearings and disposed between the outer peripheral portion of the clutch outer ring 40 and the opening 31.

The output shaft 41 is supported by bearings 51 so as to be rotatable relative to the clutch outer ring 40. The bearings 51 are rolling bearings and disposed between the inner peripheral portion of the clutch outer ring 40 and the outer peripheral portion of the output shaft 41.

The output shaft 41 is coupled to a shaft 19 such that the shaft 19 always rotates in unison with the output shaft 41 and such that motive power is transmitted from the output shaft 41 to the rotor 10 of the oil pump 1 through the shaft 19. In the example shown, the shaft 19 is coupled to the output shaft 41 by spline fitting, but they may be coupled together by any other means that permits transmission of motive power between the output shaft 41 and the shaft 19.

The shaft 19 always rotates in unison with the rotor 10 too. For such rotation in unison, the shaft 19 and the rotor 10 may be formed as an integral, one-piece member, or may be coupled together by a coupling means that permits transmission of motive power between the shaft 19 and the rotor 10. In the example shown, the rotor 10 has protrusions circumferentially engaged in grooves of the shaft 19, each groove being recessed from the end surface of the shaft 19 facing the rotor 10 and also recessed from the outer periphery of the shaft 19, to allow transmission of motive power between the shaft 19 and the rotor 10.

The shaft 19 is supported by a bearing 52 so as to be rotatable relative to the housing 13. The bearing 52 is a rolling bearing and disposed between the outer peripheral portion of the shaft 19 and the inner peripheral portion of the housing 13.

The shaft 19 is a separate member from the input shaft 20 of the second one-way clutch 6, and supported by a bearing 53 so as to be rotatable relative to the input shaft 20. The bearing 53 is a rolling bearing and is disposed between the outer peripheral portion of the shaft 19 and the inner peripheral portion of the input shaft 20. The bearing 53 is a needle bearing in the example shown, but may be a ball bearing.

The input shaft 20 is supported by a bearing 54 so as to be rotatable relative to the housing 13. The bearing 54 is a roller bearing and disposed between the outer peripheral portion of the input shaft 20 and the inner peripheral portion of the housing 13.

The bearings 50, 51, 52, 53, and 54 cooperate with each other to rotatably support the one-way clutch 4, the rotor 10, and the second one-way clutch 6 while keeping them coaxial with each other.

The bearings 52 and 54, which are located outside of the transmission case and disposed, respectively, between the housing 13 and the shaft 19 and between the housing and the input shaft 20, are sealed bearings. If it is desired to positively prevent oil leakage out of the housing 13 and entry of foreign matter into the housing 13, an oil seal or seals may be added between the housing 13 and the input shaft 20.

The first and second one-way clutches 4 and 6 are roller clutches in the embodiment, but may be sprag one-way clutches, which use sprags as engagement elements, as disclosed in the JP '543 patent.

As described above, the oil pump driving device according to the present invention is configured such that the clutch outer ring 40, see FIG. 1, and the input shaft 20, see FIG. 1, are rotated in the counterclockwise direction in FIGS. 4 and 3 by the motive power from the engine 3, shown in FIG. 2, and the motive power from the electric motor 5, shown in FIG. 2, respectively. Thus, the first one-way clutch 4, see FIGS. 1 and 4, transmits the motive power from the engine 3, shown in FIG. 2, only in the counterclockwise direction in FIG. 4, while the second one-way clutch 6, see FIGS. 1 and 3, transmits the motive power from the electric motor 5, shown in FIG. 2, only in the counterclockwise direction in FIG. 3.

With this arrangement, while the engine 3, shown in FIG. 2, is running and the electric motor 5 is not, the first one-way clutch 4 is engaged, and transmits the motive power from the engine 3 through the output shaft 41 of the first one-way clutch 4, shown FIGS. 1 and 4, to the shaft 19 of the oil pump 1. The motive power transmitted to the shaft 19 causes the rotor 10, which is rotationally fixed relative to the shaft 19, to rotate in the counterclockwise direction in FIG. 3, thus driving the oil pump 1. The counterclockwise rotation of the rotor 10 is transmitted to the second engagement elements 21 of the second one-way clutch 6. Since the input shaft 20 is stationary at this time, this means that the input shaft 20 rotates, relative to the shaft 19 and the rotor 10, in the clockwise direction in FIG. 3, so that the second one-way clutch 6 remains disengaged, and will never transmit motive power from the second one-way clutch 6 to the electric motor 5, shown in FIG. 2.

While the engine 3 is not running, and the electric motor 5 is running, the motive power from the electric motor 5 is transmitted to the input shaft 20 of the second one-way clutch 6, engaging the second one-way clutch 6. The second one-way clutch 6 thus transmits the motive power transmitted to the input shaft 20 through the second engagement elements 21, shown in FIGS. 1 and 3, to the rotor 10, thus driving the oil pump 1. Since the clutch outer ring 40 is stationary at this time, this means that the clutch outer ring 40 rotates, relative to the output shaft 41, the shaft 19, and the rotor 10, in the clockwise direction in FIG. 4, so that the first one-way clutch 4 remains disengaged, and will never transmit motive power from the first one-way clutch 4 to the engine 3, shown in FIG. 2.

The electric motor 5 may be configured to be always driven irrespective of whether the engine 3 is running or not. With this arrangement, when the engine 3 starts, i.e., when both the engine 3 and the electric motor 5 are running, since the first one-way clutch 4 and the second one-way clutch 6 are configured to transmit motive power only in the same one direction, the oil pump 1 is driven by one of the clutch outer ring 40 and the input shaft 20, shown in FIG. 1, that is rotating at a higher speed than the other.

As described above, the oil pump driving device is configured such that the single oil pump 1 can be driven by either of the engine 3 and the electric motor 5 (see FIG. 2). Since this oil pump driving device further includes a transmission case 2 of which the partition wall 30 defines an opening 31, and the first one-way clutch 4 on the engine 3 side is disposed within the opening 31 of the transmission case 2, the wall thickness of the partition wall 30 is effectively used to install the first one-way clutch 4. Since the rotor 10 of this oil pump driving device has an inner peripheral portion 18 defining a hollow space, and the second one-way clutch 6 is disposed inside of the inner peripheral portion 18, the axial width of the rotor 10 is effectively used to install the second one-way clutch 6 (see FIG. 1). Thus, with the oil pump driving device fully assembled, i.e., with the transmission case 2 coupled to the oil pump 1, this oil pump driving device is small in axial dimension. That is, compared with a conventional oil pump driving device of which two one-way clutches are disposed on the respective sides of the oil pump, such as the one disclosed in the JP '543 patent, the oil pump driving device according to the present invention has a shorter axial dimension due to the fact that the wall thickness of the partition wall 30 and the axial width of the rotor 10 are used to install the one-way clutches 4 and 6.

In this oil pump driving device, since the first one-way clutch 4 has a sprocket 44 for transmitting the motive power from the engine 3, the first one-way clutch 4 can be connected to the engine-side motive power transmission path 7 within the transmission case 2. This makes it unnecessary to provide, outside the transmission case 2, a space for installing a connecting joint (see FIGS. 1 and 2).

Since the first one-way clutch 4 has a clutch outer ring 40 disposed within the opening 31 of the transmission case 2, and the sprocket 44 is integral with the clutch outer ring 44, a large-diameter sprocket can be used as the sprocket 44, this oil pump driving device can be used for a high motive power engine 3.

In this oil pump driving device, since the first one-way clutch 4 includes an output shaft 41 disposed within the opening 31 of the transmission case 2, and the oil pump 1 is coupled to the output shaft 41, and includes a shaft 19 configured to transmit motive power to the rotor 10, it is possible to mount the first one-way clutch 4 into the transmission case 2, separately from the step of mounting the second one-way clutch 6 into the oil pump 1, and couple the output shaft 41 to the shaft 19 when coupling the transmission case 2 to the oil pump 1.

The embodiments disclosed here are mere examples and are not intended to limit the invention whatsoever. The present invention is defined not by the above description of the invention but by the appended claims, and should be understood to read on every modification within the scope of the claims, as well as every modification that is considered to be an equivalent to what is recited in the appended claims.

DESCRIPTION OF THE REFERENCE NUMERALS

1. Oil pump
2. Transmission case
3. Engine
4. First one-way clutch
5. Electric motor
6. Second one-way clutch
10. Rotor
18. Inner peripheral portion
19. Shaft
30. Partition wall
31. Opening
40. Clutch outer ring
41. Output shaft
44. Sprocket

What is claimed is:

1. An oil pump driving device comprising:
a single oil pump including a rotor configured to receive motive power;
a first one-way clutch configured to transmit motive power from an engine only in one direction;
a second one-way clutch configured to transmit motive power from an electric motor only in the one direction; and
a transmission case having a partition wall formed with an opening,
wherein the first one-way clutch is disposed within the opening of the transmission case;
wherein the rotor has an inner peripheral portion defining a hollow space;
wherein the second one-way clutch is disposed inside of the inner peripheral portion of the rotor; and
wherein the transmission case is coupled to the oil pump.

2. The oil pump driving device of claim 1, wherein the first one-way clutch includes a sprocket configured to transmit the motive power from the engine.

3. The oil pump driving device of claim 2, wherein the first one-way clutch further includes a clutch outer ring disposed within the opening of the transmission case, and the sprocket is integral with the clutch outer ring.

4. The oil pump driving device of claim 3, wherein the first one-way clutch further includes an output shaft disposed within the opening of the transmission case, and
the oil pump further includes a shaft connected to the output shaft and configured to transmit motive power to the rotor.

5. The oil pump driving device of claim 2, wherein the first one-way clutch further includes an output shaft disposed within the opening of the transmission case, and
the oil pump further includes a shaft connected to the output shaft and configured to transmit motive power to the rotor.

6. The oil pump driving device of claim 1, wherein the first one-way clutch further includes an output shaft disposed within the opening of the transmission case, and
the oil pump further includes a shaft connected to the output shaft and configured to transmit motive power to the rotor.

* * * * *